US009706480B2

(12) United States Patent
Horvat et al.

(10) Patent No.: US 9,706,480 B2
(45) Date of Patent: Jul. 11, 2017

(54) METHOD FOR DETERMINING CELL IDENTIFICATION INFORMATION

(71) Applicant: Intel Mobile Communications GmbH, Neubiberg (DE)

(72) Inventors: Michael Horvat, Munich (DE); Tian Yan Pu, Dresden (DE)

(73) Assignee: Intel Deutschland GmbH, Neubiberg (DE)

( * ) Notice: Subject to any disclaimer, the term of this patent is extended or adjusted under 35 U.S.C. 154(b) by 669 days.

(21) Appl. No.: 13/851,163

(22) Filed: Mar. 27, 2013

(65) Prior Publication Data

US 2014/0293954 A1    Oct. 2, 2014

(51) Int. Cl.
*H04W 48/16*    (2009.01)
*H04L 5/00*    (2006.01)

(52) U.S. Cl.
CPC .......... *H04W 48/16* (2013.01); *H04L 5/0053* (2013.01); *H04L 5/0007* (2013.01)

(58) Field of Classification Search
CPC .... H04W 48/16; H04W 24/08; H04L 5/0053; H04L 5/0051; H04L 5/0007; H04L 5/0048; H04L 25/0216; H04L 25/0226; H04L 27/2647; H04L 25/0244; H04L 25/025; H04L 25/0256; H04L 25/0232; H04B 1/7083; H04J 11/0086
See application file for complete search history.

(56) References Cited

U.S. PATENT DOCUMENTS

| | | | | |
|---|---|---|---|---|
| 2008/0267303 | A1* | 10/2008 | Baldemair | H04B 1/7075 375/260 |
| 2010/0182903 | A1* | 7/2010 | Palanki | H04L 1/0041 370/225 |
| 2010/0246376 | A1* | 9/2010 | Nam | H04L 5/0051 370/208 |
| 2011/0103350 | A1* | 5/2011 | Lindoff | H04W 36/0094 370/332 |
| 2011/0143773 | A1* | 6/2011 | Kangas | G01S 5/02 455/456.1 |
| 2012/0163223 | A1* | 6/2012 | Lo | H04L 5/0007 370/252 |

(Continued)

OTHER PUBLICATIONS

"3rd Generation Partnership Project; Technical Specification Group Radio Access Network; Evolved Universal Terrestrial radio Access (E-UTRA); Physical Channels and Modulation (Release 11)"; 3GPP TS 36.211 v11.2.0 (Feb. 2013); p. 1-43.

(Continued)

*Primary Examiner* — Yee Lam
(74) *Attorney, Agent, or Firm* — Eschweiler & Potashnik, LLC

(57) ABSTRACT

A method includes receiving a signal including a two-dimensional signal pattern in a time-frequency representation, the two-dimensional signal pattern including reference signals at first predetermined positions in the two-dimensional signal pattern. The method further includes determining a frequency-time transformation based on the reference signals to obtain a time-domain signal. The method further includes determining a first cell identification information based on a threshold criterion with respect to the time-domain signal.

18 Claims, 11 Drawing Sheets

(56) References Cited

U.S. PATENT DOCUMENTS

| | | | | |
|---|---|---|---|---|
| 2012/0163503 A1* | 6/2012 | Ancora | ............... | H04L 5/0048 375/316 |
| 2013/0070869 A1* | 3/2013 | Motamed | ............ | H04L 5/0051 375/295 |
| 2014/0029483 A1* | 1/2014 | Challa | ................. | H04W 48/16 370/280 |
| 2014/0056165 A1* | 2/2014 | Siomina | .............. | H04B 1/7083 370/252 |
| 2014/0112250 A1* | 4/2014 | Bahrenburg | ........ | H04B 1/7083 370/328 |
| 2015/0208328 A1* | 7/2015 | Drugge | ............... | H04B 1/7083 455/434 |

OTHER PUBLICATIONS

Kaifeng Guo, et al.; "Differential Carrier Frequency Offset and Sampling Frequency Offset Estimation for 3GPP LTE"; 2011 IEEE, p. 1-5.

Wen Xu, et al.; "Robust Synchronization for 3GPP LTE System"; 2010 IEEE Globecom Proceedings, p. 1-5.

* cited by examiner

US 9,706,480 B2

METHOD FOR DETERMINING CELL IDENTIFICATION INFORMATION

FIELD

The disclosure relates to methods for determining cell identification information and to methods for verifying cell identification information. The disclosure further relates to devices to perform such methods.

BACKGROUND

Ghost cell detection may be an issue caused by a cell search. A main task of a cell search may be to find the strongest cell Ids and place them in an ordered cell list. In an acquisition phase, the strongest cell may be chosen to establish the data link. Other strong cells may be further tracked in order to enable a fast cell handover by the UE (User Equipment). A basic problem may occur when the cell search peaks suggest detected cells, which are actually not synchronized at the proposed frame position or not existing at all. These wrongly detected cells may be called "ghost cells". If the UE assumes a detected ghost cell is a valid cell and initiates further acquisition procedures, it may be dropped by the network. Thus, additional processing may be required to ensure that a cell search only detects valid cells. It may be desirable to find a way to differentiate between true cells and ghost cells.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

FIG. 7a is an example ghost cell simulation diagram 700a illustrating a case of false detection of PSS1 for an AWGN channel resulting in a "ghost" PSS1 peak 701a.

DETAILED DESCRIPTION

Figure 1:
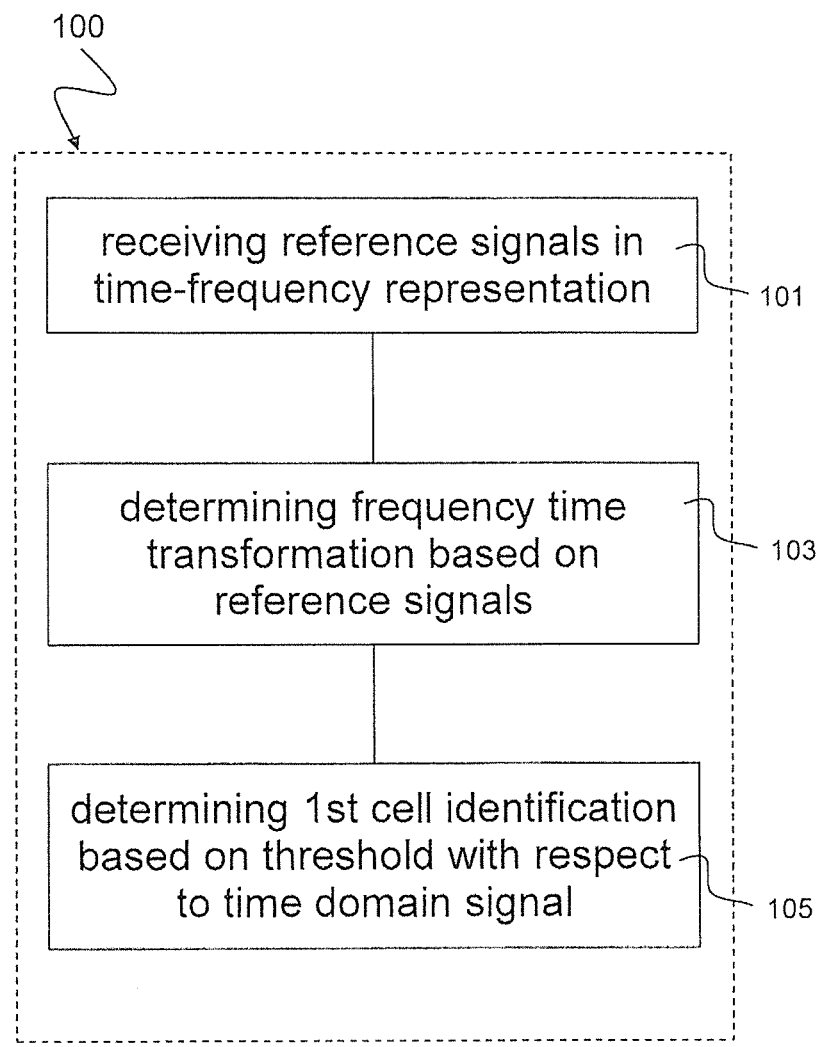
FIG. 1 is a schematic diagram of a method 100 in accordance with the disclosure for determining cell identification information.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The following terms, abbreviations and notations are used herein:
PSS: Primary Synchronization Signal,
SSS: Secondary Synchronization Signal,
LTE: Long Term Evolution,
UE: User Equipment,
PRB: Physical Resource Block,
RS: Reference Signal,
RE: Resource Element,
IFFT: Inverse Fast Fourier Transform,
FFT: Fast Fourier Transform,
CIR: Channel Impulse Response,
OFDM: Orthogonal Frequency Division Multiplex,
CRS: Cell-specific Reference Signal,
eNodeB: E-UTRAN Node B, also known as Evolved Node B, (abbreviated as eNodeB or eNB) is the element in E-UTRA of LTE that is the evolution of the element Node B in UTRA of UMTS. It is the hardware that is connected to the mobile phone network that communicates directly with mobile handsets (UEs),
AWGN Additive White Gaussian Noise,
EPA5: "Extended Pedestrian A" multi-path fading propagation conditions according to 3GPP technical specification 36.101 V11.3.0, using a Doppler frequency of 5 Hz,
EVA70: "Extended Vehicular A model" multi-path fading propagation conditions according to 3GPP technical Specification 36.101 V11.3.0, using a Doppler frequency of 70 Hz,
ETU70: "Extended Typical Urban model" multi-path fading propagation conditions according to 3GPP technical specification 36.101 V11.3.0, using a Doppler frequency of 70 Hz,
ETU300: "Extended Typical Urban model" multi-path fading propagation conditions according to 3GPP technical specification 36.101 V11.3.0, using a Doppler frequency of 300 Hz.

The methods and devices described herein may be based on two-dimensional signal patterns, reference signals and frequency-time transforms of reference signals. It is understood that comments made in connection with a described method may also hold true for a corresponding device configured to perform the method and vice versa. For example, if a specific method act is described, a corresponding device may include a unit to perform the described method act, even if such a unit is not explicitly described or illustrated in the figures. Further, it is understood that the features of the various example aspects described herein may be combined with each other, unless specifically noted otherwise.

The methods and devices described herein may be implemented in wireless communication networks, in particular communication networks based on an LTE and/or OFDM standard. The methods and devices described below may further be implemented in a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in compliance with mobile standards such as e.g. the Long Term Evolution (LTE) standard. LTE (Long Term Evolution), marketed as 4G LTE, is a standard for wireless communication of high-speed data for mobile phones and data terminals. It is based on the GSM/EDGE and UMTS/HSPA network technologies, increasing the capacity and speed using a different radio interface together with core network improvements. The standard is developed by the 3GPP (3rd Generation Partnership Project) and is specified in its Release 8 document series, with enhancements described in Releases 9, 10, 11 and higher.

In the following, Orthogonal Frequency-Division multiplexing (OFDM) systems are described. OFDM is a scheme for encoding digital data on multiple carrier frequencies. OFDM has developed into a popular scheme for wideband digital communication, whether wireless or over copper wires, used in applications such as digital television and audio broadcasting, DSL broadband internet access, wireless networks, and 4G mobile communications. OFDM is a Frequency-Division Multiplexing (FDM) scheme used as a digital multi-carrier modulation method. A large number of closely spaced orthogonal sub-carrier signals may be used to carry data. The orthogonality may prevent crosstalk between sub-carriers. The data may be divided into several parallel data streams or channels, one for each sub-carrier. Each sub-carrier may be modulated with a conventional modulation scheme (such as quadrature amplitude modulation or phase-shift keying) at a low symbol rate, maintaining total data rates similar to conventional single-carrier modulation schemes in the same bandwidth. OFDM may be essentially identical to Coded OFDM (COFDM) and Discrete Multi-Tone modulation (DMT).

The methods and devices described herein may be based on a PSS/CSS cell search described in the following. In LTE, the system synchronization is usually first accomplished in downlink (DL) and then in uplink (UL). The User Equipment (UE) may perform an initial time and frequency offset estimation by detecting synchronization signals of base stations or eNodeBs. When this estimation is successfully performed, the UE can acquire the frame structure of the DL signal, and read basic system information, e.g. cell identity (cell ID), DL bandwidth, etc.

In LTE, a total of 504 cell IDs may be defined as Nc=3 Ng+Ns, where Ng=0, 1, . . . , 167 are the cell group ID and Ns=0, 1, 2 are the physical layer ID or also called sector ID within a cell group. The information on Ns and Ng may be carried by two DL synchronization channels of an eNB, that may be the primary synchronization channel (P-SCH) signal (PSS) and the secondary synchronization channel (S-SCH) signal (SSS), respectively. The PSS may be embedded in the last OFDM symbol and the SSS in the second last OFDM symbol of the subframe 0 and 5 in each radio frame. Once a UE successfully detects and decodes the PSS and SSS, the cell ID of the eNodeB can be determined.

The P-SCH signal may consist of three length-62 Zadoff-Chu sequences in frequency domain which are orthogonal to each other. Each sequence may correspond to a sector identity Ns within a group of three sectors (physical cell). The S-SCH signal may consist of a frequency-domain sequence d(n) with the same length as the P-SCH, which is an interleaved concatenation of the two length-31 binary sequences s0(n) and s1(n). In order to distinguish between different sector groups, i.e. physical cells, s0(n) and s1(n) may depend on a pair of integers m0 and m1, which may be unique for each group-ID Ng.

In order to identify the sector with the highest signal level, a cross-correlation of the received symbols on the 62 centered sub-carriers with replicas of the three P-SCH signals in the frequency domain may be performed. The magnitude of the cross correlator output corresponding to the sector with the highest signal may show a large peak compared to the other correlation terms due to orthogonality between sequences. Thus, the estimated sector-ID Ns may be given by that maximum. Simultaneously, the sector identification may indicate the radio frame start, as the P-SCH position within the radio frame is already known, however with an uncertainty between the first and sixth sub-frame. This information may be retrieved by decoding the S-SCH signal.

The group-ID Ng can be jointly estimated with the carrier frequency offset and the sub-frame index within the radio frame (0 or 5). The basic concept may be to exploit the cyclic shifts of the two length-31 binary sequences s0(n) and s1(n) according to the pair of integers m0 and m1, which identify the group-ID.

In the following, cell-specific reference signals are described. Cell-specific reference sequences may consist of complex-valued entries derived from a pseudo random sequence which may be generated by a length-31 Gold sequence, the state of which may be initialized by an initialization value at the beginning of each OFDM symbol. The initializing value may depend on the cell ID Nc.

Figure 4:
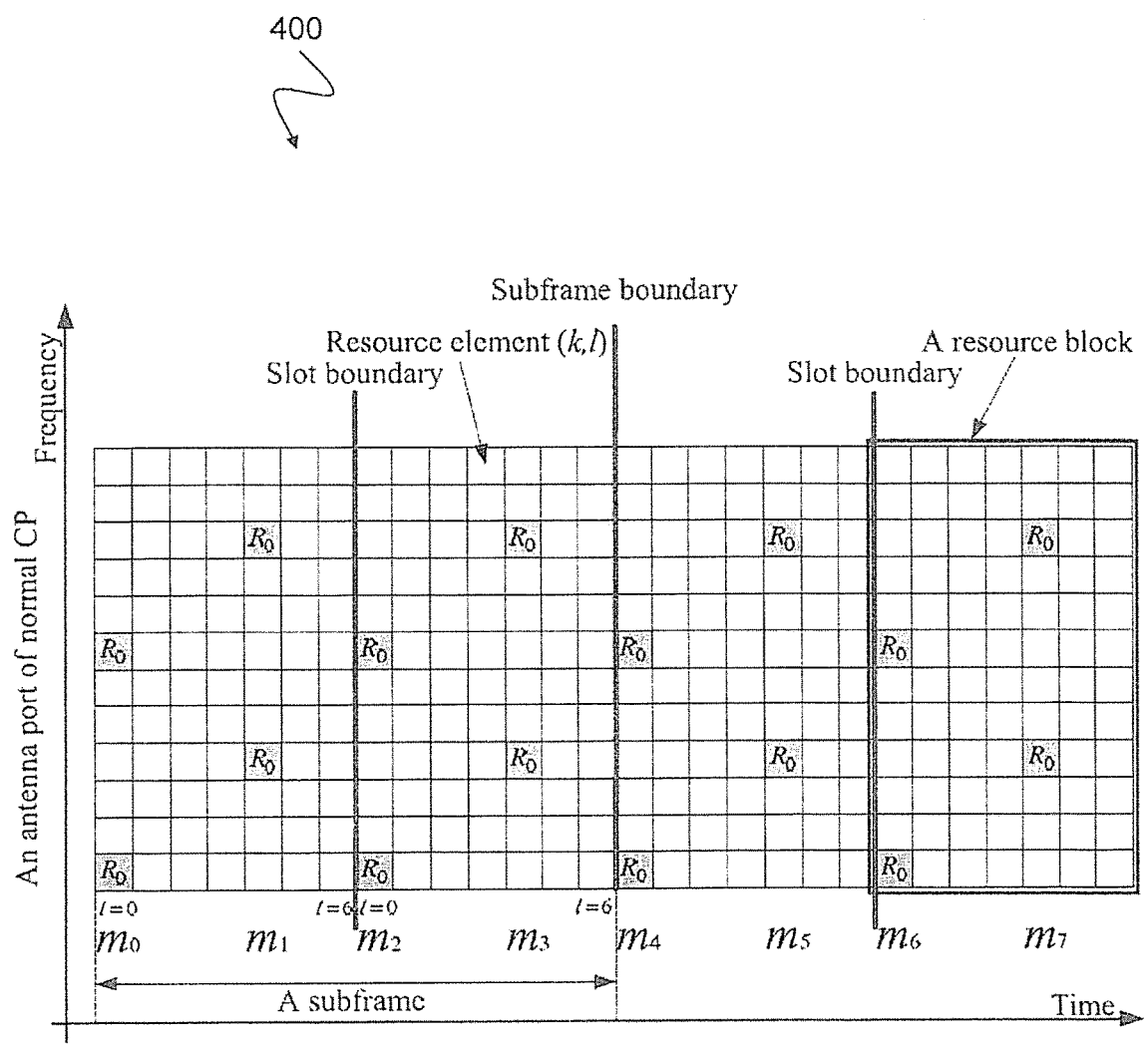
FIG. 4 is a schematic time-frequency representation of two example sub-frames 400 of a radio frame including reference signals R0 used for determining cell identification information.

The cell-specific reference sequences thus may be unique for each slot, OFDM symbol and cell index, and as well depend on the cyclic prefix type. The sequence elements may be mapped on the time-frequency resource grid on every sixth sub-carrier within two OFDM symbols in every slot. In case of multiple transmit antennas, resource elements used for the reference signal transmission shall not be used for transmission on any other antenna in the same slot and thus may be set to zero. An example for the allocation of the reference sequences within the resource grid is illustrated in FIG. 4 as described below.

FIG. 1 is a schematic diagram of a method 100 in accordance with the disclosure for determining cell identification information. The method 100 includes receiving a signal including a two-dimensional signal pattern in a time-frequency representation at 101. The two-dimensional signal pattern includes reference signals at first predetermined positions in the two-dimensional signal pattern. The method 100 further includes determining a frequency-time transformation based on the reference signals to obtain a time-domain signal at 103. The method 100 further includes determining a first cell identification information based on a threshold criterion with respect to the time-domain signal at 105.

In one example, the reference signals may include the cell identification information, and the cell identification information may be unique for each cell of a cellular radio system.

In one example, the reference signals may include cell-specific reference signals. In one example, the first predetermined positions of the reference signals in the two-dimensional signal pattern may be uniformly distributed over the two-dimensional signal pattern, e.g. according to the illustration of FIG. 4, where reference signals R0 are present for each resource element (k,l) at positions (k=0, l=0), (k=6, l=0), (k=3, l=4) and (k=9, l=4).

In one example, the frequency-time transformation may include an Inverse Fast Fourier Transform (IFFT), a Fast Fourier Transform (FFT), an Inverse Discrete Fourier Transform or a Discrete Fourier Transform. In one example, the frequency-time transformation may be based on reference signals of a same time index in the two-dimensional signal pattern, e.g. all reference signals R0 for a symbol time index m=0 according to the representation of FIG. 4 may be used as inputs for IFFT processing.

In one example, the frequency-time transformation may be determined by applying an Inverse Fast Fourier Transform to reference signals of a same time index in the two-dimensional signal pattern wherein the reference signals of the same time index may be zero-padded with respect to a length of the Inverse Fast Fourier Transform, e.g. all reference signals R0 for a symbol time index m=0 according to the representation of FIG. 4 may be used as inputs for IFFT processing. Further inputs for IFFT processing may be zeros which may be used for zero-padding to a radix-2 value of the IFFT.

In one example, the received signal may include a superposition of a signal received from a target cell of a cellular radio system and a signal received from an interfering cell of the cellular radio system. In one example, the method 100 may include using the first cell identification information for verifying a second cell identification information determined based on a synchronization signal positioned at a second predetermined position in the two-dimensional signal pattern different from the first predetermined positions in the two-dimensional signal pattern. In one example, the synchronization signal may include a primary synchronization signal and/or a secondary synchronization signal.

In one example, the second cell identification information may be determined based on a second threshold criterion with respect to a correlation of the synchronization signal in the time domain. In one example, a bandwidth of the synchronization signal may be smaller than a bandwidth of the reference signals. The higher bandwidth corresponds to better timing accuracy. In one example, the timing accuracy, i.e., the misalignment of corresponding peaks of the first and second signal is below a cyclic prefix (CP). The method 100 provides a time accuracy better than a cyclic prefix (CP) based processing because any operation on the two-dimensional signal pattern, i.e. the time-frequency grid, would have a timing accuracy below the cyclic prefix. In one example, a number of frequency-domain samples of the synchronization signal may be smaller than a number of frequency-domain samples of the reference signals. In one example, a correlation of the synchronization signal in time domain provides independent information from the frequency-time transformation based on the reference signals. When PSS/SSS are present in LTE, frequencies are reserved and must not be used by reference signals.

An example of the method 100 may apply IFFT processing on the RS. The RS may be modulated by m-sequences that may be defined by the cell ID and time position of the RS symbol. The RS resource elements (REs) may be located with a predefined time and subcarrier spacing within the LTE time-frequency grid. Therefore, the IFFT output may be an under- or re-sampled version of the channel impulse response (CIR) sampled according to the configured UE bandwidth. Since the PSS/SSS may provide the slot (half subframe) and radio frame timing, the IFFT processing may resolve the fine timing defined by the minimum RS subcarriers spacing. In a realization of the method, the IFFT processing may be used to discover the CIR echo paths as can be seen from FIG. 6 described below. These echo peaks may only occur in a defined capture range in the correct OFDM frame. Cell identification information can be derived from these CIR peaks. As described above, the cell-specific reference signals carry cell ID information. That cell ID information can be extracted by evaluating the sample index where the CIR peaks occur.

Figure 2:
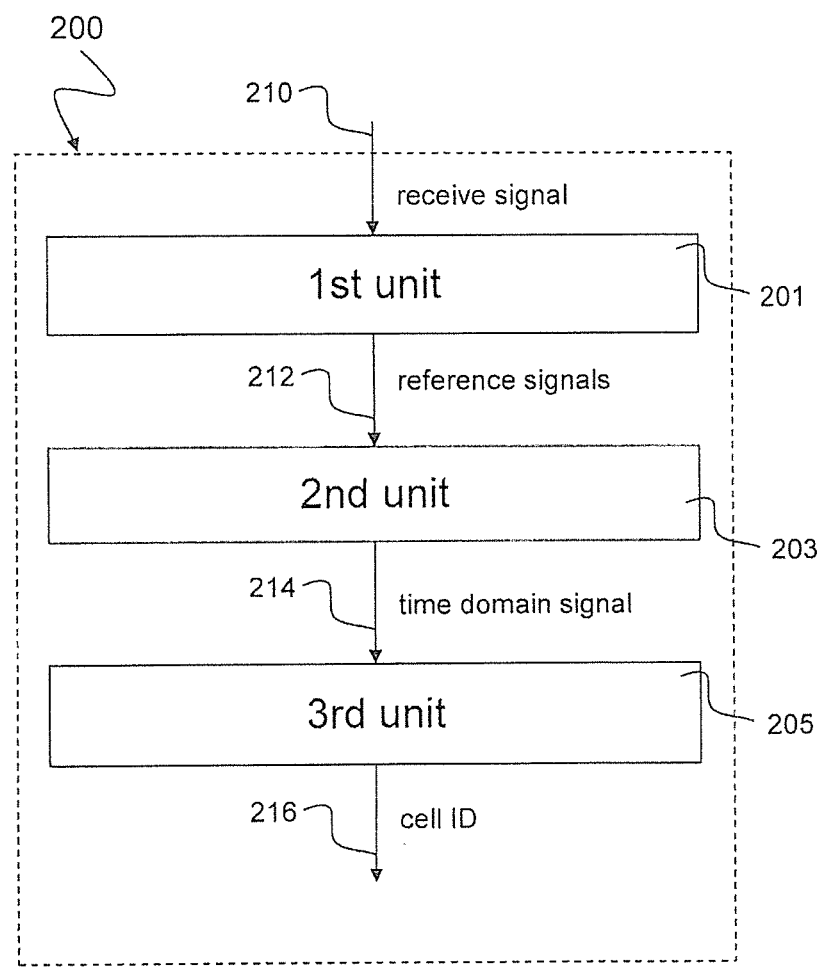
FIG. 2 is a schematic diagram of a device 200 in accordance with the disclosure for providing cell identification information.

FIG. 2 is a schematic diagram of a device 200 in accordance with the disclosure for providing cell identification information. The device 200 includes a first unit 201, a second unit 203 and a third unit 203. The first unit 201 receives a receive signal 210 including a two-dimensional signal pattern in a time-frequency representation. The two-dimensional signal pattern includes reference signals at predetermined positions in the two-dimensional signal pattern, e.g. reference signals R0 according to the representation of FIG. 4 described below. The second unit 203 determines a frequency-time transformation, e.g. a IFFT, FFT, IDFT or DFT, based on the reference signals to obtain a time-domain signal 214. The third unit 205 provides a cell identification information 216 based on a threshold criterion with respect to the time-domain signal 214.

The first unit 201, second unit 203 and third unit 203 may be hardware units implemented in a chip. The first unit 201, second unit 203 and third unit 203 may also be implemented as software on a computer. The first unit 201, second unit 203 and third unit 203 may also be implemented as processing circuits, e.g. application specific integrated circuits (ASICs) on a processor, e.g. a digital signal processor (DSP).

The first unit 201 may represent a receiver circuit and the second and third units 203, 205 may represent processing circuits.

In one example, the device 200 may include a chip, and the device 200 may be part of a mobile device. In an example implementation, the received signal may include an orthogonal frequency division multiplex signal, e.g. according to the representation of FIG. 4.

Figure 3:
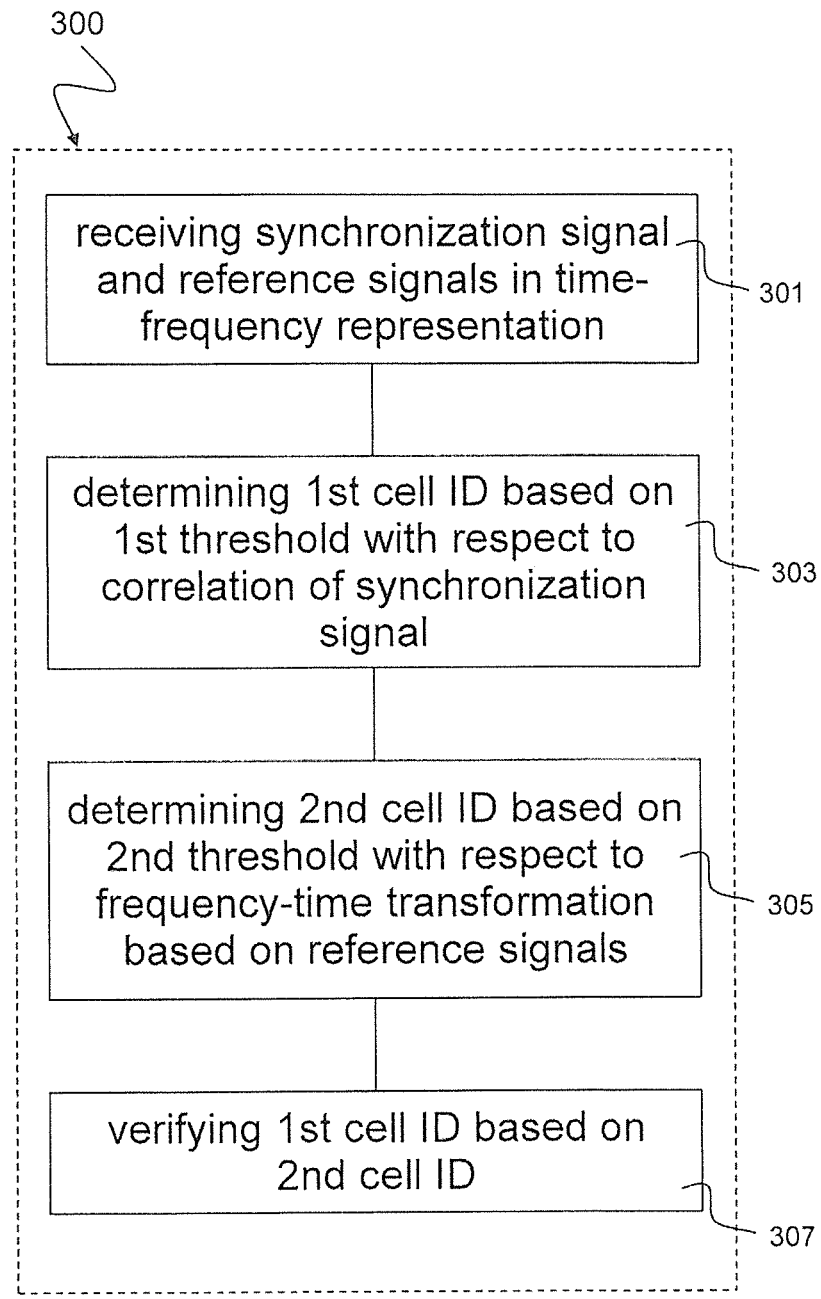
FIG. 3 is a schematic diagram of a method 300 in accordance with the disclosure for verifying cell identification information.

FIG. 3 is a schematic diagram of a method 300 in accordance with the disclosure for verifying cell identification information. The method 300 includes receiving a signal including a two-dimensional signal pattern in a time-frequency representation at 301. The two-dimensional signal pattern includes a synchronization signal at a first predetermined position in the two-dimensional signal pattern and reference signals at second predetermined positions in the two-dimensional signal pattern different from the first predetermined position. The method 300 further includes determining a first cell identification information based on a first threshold criterion with respect to a correlation of the synchronization signal at 303. The method 300 further includes determining a second cell identification information based on a second threshold criterion with respect to a frequency-time transformation based on the reference signals at 305. The method 300 further includes verifying the first cell identification information based on the second cell identification information at 307.

In one example, the reference signals may include cell-specific reference signals. In an example implementation, determining the second cell identification information may include applying an Inverse Fast Fourier Transform to the reference signals which may be zero-padded with respect to a length of the Inverse Fast Fourier Transform. In one example, the method 300 may include verifying if the second cell identification information lies within a time range in which the first cell identification information has been determined.

By applying additional processing, that is, determining a second cell ID based on a second threshold with respect to frequency-time transformation based on reference signals 305, the method 300 may ensure that PSS/SSS cell search only detects valid cells. By using a reference-signal(RS)-based IFFT, a time-domain signal processed by a frequency-time transformation of the RS-based signal can be used to eliminate ghost cells.

While other approaches of cell search may only rely on a use of PSS and SSS with the drawback of their limited bandwidth occupation of 6 physical resource blocks (PRBs), the method 300 may exploit reference signals transmitted over the full configured system bandwidth and thus may provide additional observation samples resulting in improved estimation accuracy.

An example of the method 300 may apply IFFT processing on the RS. The RS may be modulated by m-sequences that may be defined by the cell ID and time position of the RS symbol. The RS resource elements (REs) may be located with a predefined time and subcarrier spacing within the LTE time-frequency grid. Therefore, the IFFT output may be an under- or re-sampled version of the Channel Impulse Response (CIR) sampled according to the configured UE bandwidth. Since the PSS/SSS may provide the slot (half subframe) and radio frame timing, the IFFT processing may resolve the fine timing defined by the minimum RS subcarriers spacing. The IFFT processing may be used to discover the CIR echo paths as can be seen from FIG. 6 described below. These echo peaks may only occur in a defined capture range in the correct OFDM frame. Otherwise, e.g. in case of a ghost cell detection by the PSS/SSS cell search, the RS demodulation may fail due to the misaligned m-sequence. As a consequence the IFFT output may not produce significant peaks above the noise level. But if the PSS/SSS frame timing may be valid, the IFFT processing may result in CIR peaks as shown below with respect to FIGS. 7a to 7e. Therefore, the method 300 may eliminate ghost cell detection and add fine timing accuracy to the PSS/SSS cell search.

FIG. 4 is a schematic time-frequency representation of two example sub-frames 400 of a radio frame, e.g. an LTE radio frame, including reference signals R0 used for determining cell identification information. An LTE radio frame of 10 ms duration comprises 10 sub-frames of 1 ms duration, each sub-frame comprising two slots, each slot of 0.5 ms duration as illustrated in FIG. 4. An OFDM signal can be described with a two dimensional grid in time-frequency coordinates. In the LTE downlink, this structure may facilitate the multiplexing of the cell-specific Reference Signals (CRS), which may be mapped to the specific resource elements (k, l) as illustrated in FIG. 4. The cell-specific reference signals are denoted as R0 in FIG. 4. A cell-specific reference signal may be available to all UEs in a cell, and may contain Np reference symbols, which are also known as pilots. Pilot subcarriers are the subcarriers that the pilots are mapped to in a certain RS-embedded OFDM symbol. In the case of a single antenna port as illustrated in FIG. 1, Np pilots may be modulated onto different subcarriers according to the OFDM symbol index l within a slot.

The LTE radio frame 400 can be used by a typical LTE downlink receiver for performing initial frequency/timing synchronization, channel estimation/equalization, fine frequency/timing synchronization (tracking) and detection/decoding. The initial synchronization may be the very first task when a User Equipment (UE) tries to establish a radio connection with a network, with the target to acquire frame timing, cell ID, etc. An ML based algorithm may be employed for parameter estimation.

The LTE radio frame 400 may be used in an LTE system with scaleable transmission bandwidth from, e.g., 1.4 MHz up to 20 MHz, subcarrier spacing of 15 kHz, and QPSK modulation. The number of OFDM symbols per slot may depend on whether a normal or an extended Cyclic Prefix (CP) is used. For the normal CP, there may be 7 OFDM symbols where the CP length may not necessarily be the same for the 7 symbols. For the extended CP, there may be 6 symbols, and the CP length may be equal.

The LTE radio frame 400 can be received as receive signal 210 described above with respect to FIGS. 1 to 3. The cell-specific reference signals R0 depicted in FIG. 4 can be received by the methods 100, 300 described above with respect to FIGS. 1 and 3 and by the device 200 as described above with respect to FIG. 2.

In one example, the LTE radio frame 400 may include a number of 100 resource blocks in frequency direction at a system bandwidth of 20 MHz, each resource block having two cell-specific reference signals R0. Then, the IFFT CRS signal, i.e. the frequency time transformation based on the reference signals 103, 214, 305 as described above with respect to FIGS. 1, 2 and 3 may be processed by applying the IFFT to these 200 reference signals R0. Other signals in the time-frequency grid between the reference signals R0 can be deleted. In one example, these 200 reference signals R0 may be zero-padded to a radix-2 value of the used IFFT, e.g. zero-padded by 56 zeros to come to a value of 256 for a 256-IFFT. In one example, for reference signals R0 associated to different antenna ports, separate IFFT processing may be applied. In one example, instead of an IFFT, an FFT may be used.

In one example, the LTE radio frame 400 may include a number of 75 resource blocks in the frequency direction at a system bandwidth of 15 MHz, each resource block having two cell-specific reference signals R0. Then, the IFFT CRS signal may be processed by applying the IFFT to these 150 reference signals R0 in a similar manner as described above with respect to the 100 resource blocks.

In one example, the LTE radio frame 400 may include a number of 50 resource blocks in the frequency direction at a system bandwidth of 10 MHz, each resource block having two cell-specific reference signals R0. Then, the IFFT CRS signal may be processed by applying the IFFT to these 100 reference signals R0 in a similar manner as described above with respect to the 100 resource blocks.

In one example, the LTE radio frame 400 may include a number of 25 resource blocks in the frequency direction at a system bandwidth of 5 MHz, each resource block having two cell-specific reference signals R0. Then, the IFFT CRS signal may be processed by applying the IFFT to these 50 reference signals R0 in a similar manner as described above with respect to the 100 resource blocks.

In one example, the LTE radio frame 400 may include a number of 15 resource blocks in the frequency direction at a system bandwidth of 3 MHz, each resource block having two cell-specific reference signals R0. Then, the IFFT CRS signal may be processed by applying the IFFT to these 30 reference signals R0 in a similar manner as described above with respect to the 100 resource blocks.

In one example, the LTE radio frame 400 may include a number of 6 resource blocks in the frequency direction at a system bandwidth of 1.4 MHz, each resource block having two cell-specific reference signals R0. Then, the IFFT CRS signal may be processed by applying the IFFT to these 12 reference signals R0 in a similar manner as described above with respect to the 100 resource blocks.

Figure 5:
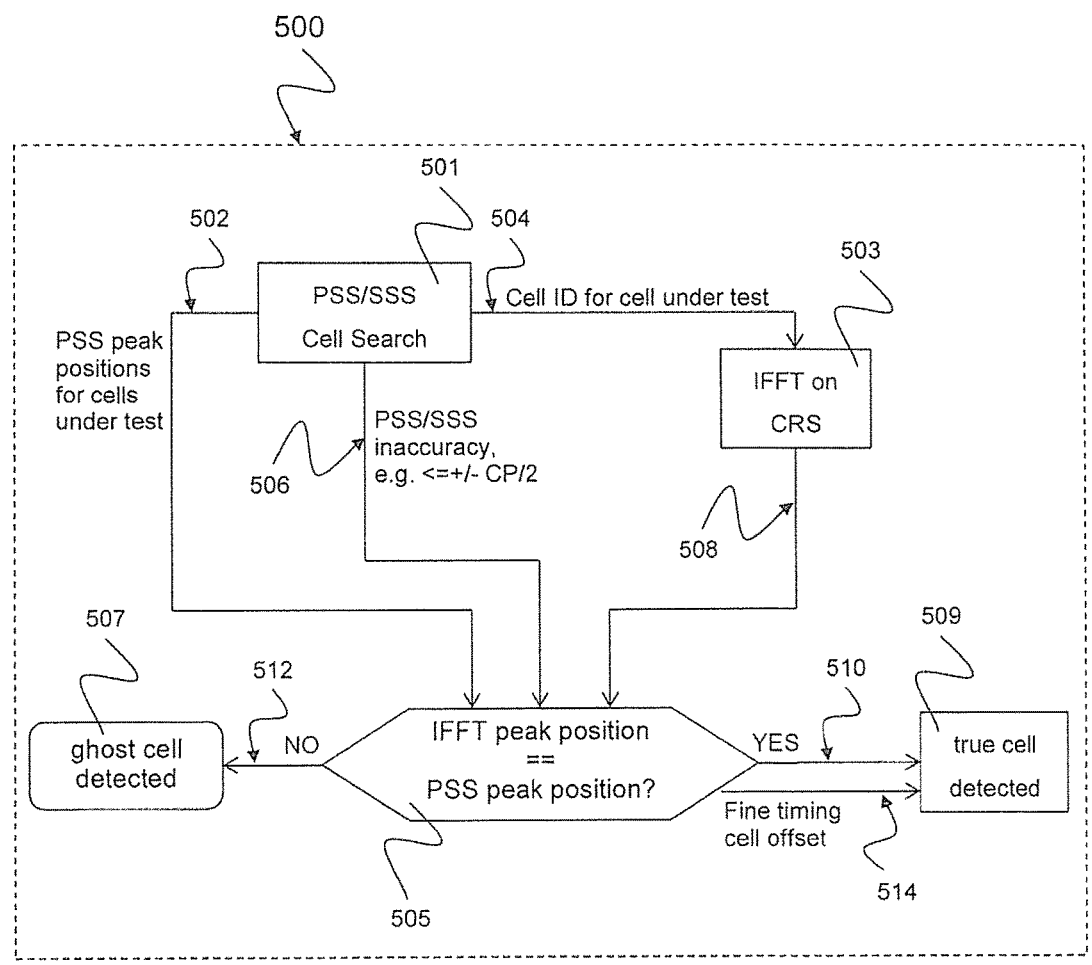
FIG. 5 is a schematic diagram of a method 500 in accordance with the disclosure for differentiating between true cells and ghost cells.

FIG. 5 is a schematic diagram of a method 500 in accordance with the disclosure for differentiating between true cells and ghost cells. PSS/SSS cell search 501 may be performed as described above. PSS/SSS cell search 501 may provide PSS peak positions 502 for cells under test and the cell ID 504 for the cells under test. PSS/SSS cell search 501 may further provide a PSS/SSS inaccuracy 506, e.g. in a range smaller than plus/minus the half cyclic prefix (CP). The cell-specific reference signals (CRS) of the cells under test may be provided to an IFFT functional block 503 which may process a time-domain signal 508 by applying an IFFT to the cell-specific reference signal CRS.

In a comparing block 505, the peak positions of the time-domain signal 508 may be compared to the peak positions 502 derived from the PSS/SSS processing 501. In one embodiment, the PSS/SSS inaccuracy 506 may be evaluated for providing the comparing result. If the IFFT peak position is equal 510 or within a range of the PSS peak position, a true cell may be detected 509, otherwise 512, a ghost cell 507 is detected, i.e., the detected cell is not a true cell. In the case when a true cell is detected 509, the fine timing cell offset 514 may be processed as described in detail below.

In one example, a consistency metric may be applied as follows: Maximum CIR peaks should be within a range of $+/-\Omega$, which may be the residual time offset after frame synchronization by the PSS/SSS cell search and can be expressed as:

$$\Omega \le |T_{CP}| \le \left| \frac{1}{2 \cdot D_{CRS} \cdot \Delta_{SC}} \right| \quad (1)$$

Adopted to LTE reference signals with $D_{CRS}=6$ times $\Delta_{SC}=15$ kHz frequency spacing, the range of $+/-\Omega$ lies within the limit of:

$$\frac{1}{2 \cdot 6 \cdot 15 \text{ kHz}} = 5.55 \, \mu s \quad (2)$$

The value $\Omega$ should not necessarily exceed the residual PSS/SSS inaccuracy, which may be typically the normal cyclic prefix (CP) duration $T_{CP}$. The upper limit of the metric may be set by the frequency spacing between two subsequent pilots, e.g. the IFFT capture range. Exceeding this range may produce ambiguous IFFT results.

If the maximum peaks are lying outside the metric range, the compared PSS/SSS cell search peak may be not necessarily aligned with the RS-based IFFT. Both timing estimates do not fit together. If no alternative PSS/SSS peak is found for this particular cell ID, the cell may be discarded for the initial acquisition and the cell search may continue for other cell IDs. If both the PSS and CRS-IFFT results are within the consistency metric $+/-\Omega$ the cell may be valid for initial acquisition.

The presented CRS-IFFT peak search may introduce a fine timing concept, which may not just eliminate the ghost cell detection, but may also improve the estimation accuracy of the fine timing cell offset to the detected PSS peak. This more accurate timing may then be used in subsequent processing or reception steps and will enhance the results of these subsequent steps.

In one example, the CRS-IFFT Fine Timing may be performed by applying the steps described in the following: Demodulating RS RE with cell ID under test. Using an IFFT greater or equal than a 128 Point IFFT for each of the RS OFDM symbols, e.g. using N50, i.e. a 10 MHz bandwidth OFDM configuration that has 100 positioning subcarriers for each OFDM symbol. Filling up samples for IFFT input by zero tailing or zero-padding, which corresponds to IFFT interpolation in the time domain. Evaluating the expression $$\text{MAX}(\text{SUM}(\text{ABS}(\text{IFFT}(\text{CRS\_RX1}))\hat{}2 + \text{ABS}(\text{IFFT}(\text{CRSofdm\_RX2}))\hat{}2) \quad (3)$$

of all IFFT CRS symbol outputs, which means averaging after the absolute value operation ABS( ). MAX( ) describes a maximum value operation, SUM( ) describes a summation operation, ABS( ) describes an absolute value operation of each element of the vector IFFT(CRS_RX1), $\hat{}2$ denotes a square operation of each element of that squared vector, IFFT( ) describes an Inverse Fast Fourier Transform, CRS_RX1 describes a vector representing a set of cell-specific reference signals of antenna port 1 and CRSofdm_RX2 describes a vector representing a set of cell-specific reference signals of antenna port 2. It is assumed that 2 RX (receive) antennas are available. This averaging may eliminate sensitivity against carrier frequency offset (CFO) introduced by the local oscillator in the non-synchronized eNodeBs. The sum of squares operation described here is also named "non-coherent combining".

Figure 6:
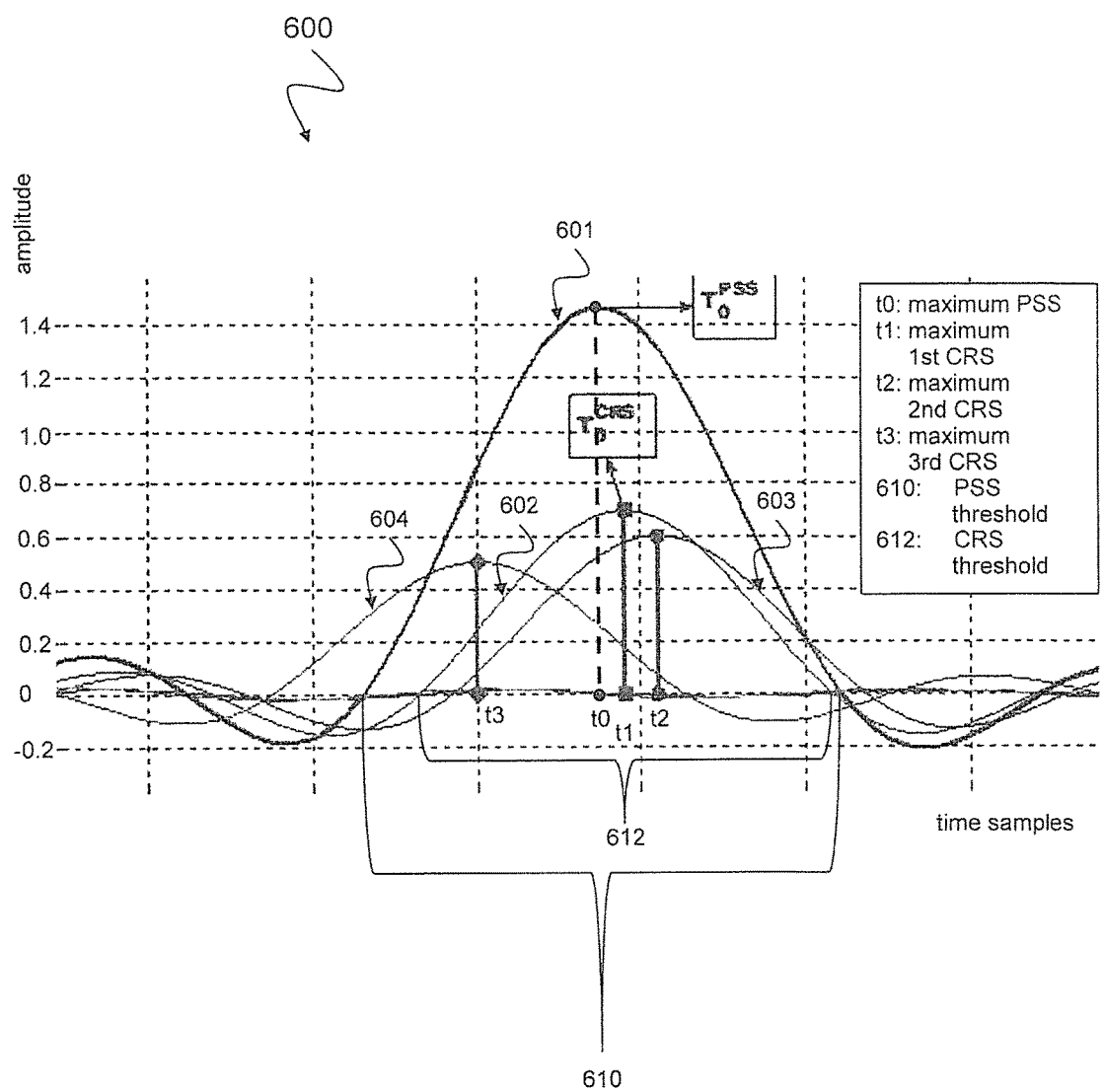
FIG. 6 is a schematic diagram 600 of a correlation signal 601 based on a PSS cell search and time-domain signals 602, 603, 604 based on a CRS cell search.

The UE may perform an initial cell search based on PSS correlation in the time domain. However, the time resolution for cell synchronization may be limited by the PSS properties, e.g. 62 times 15 kHz signal bandwidth. Compared to PSS, more CRS frequency-domain samples are available, which may increase the estimation quality, e.g., SINR. Also, the CRS may be distributed over the full system bandwidth with a spacing of 6 times 15 kHz. Therefore, the IFFT on CRS may lead to a higher time resolution. In addition, the CRS may be modulated by the cell ID. The CRS-based IFFT processing may be orthogonal to the PSS cell search processing and may provide reliable information, which is derived independently from the PSS approach, whether PSS cell search has detected a real cell or a ghost cell. If a ghost cell is detected, the CRS-based IFFT output may not show a significant peak at the respective PSS time position. If the cell identified by the PSS cell search is a valid one, the CRS-based IFFT may show a dominant peak at the same time location as illustrated in FIG. 6 described below. This joint metric may insure proper cell identification by using two independent signals. It is very unlikely that these two independent signals produce peaks at the same position accidentally. Therefore, if simultaneous peaks are observed the likelihood that indeed a correct cell has been detected is much higher. By applying the transformation into the time domain, e.g. by means of an IFFT, the comparison of the peaks can be performed at a higher accuracy than if the CRS were simply processed without that transformation. In an OFDM system, all signals that arrive within the CP (cyclic Prefix) contribute to the signal of the relevant resource elements. By applying the time-domain transformation, a higher accuracy can be achieved and thus the comparison of the peaks can be done at a higher accuracy and thus allows discriminating with better accuracy whether peaks derived from PSS and CRS coincide truly or accidentally. This is possible because two peaks derived from PSS and CRS may appear accidentally rather close to each other for a ghost cell, but if the accuracy of evaluation in the time domain is high, as with the proposed scheme, it is still possible to reject such a ghost cell in most cases unless the proximity of the peaks is below the timing accuracy of the method. The IFFT based approach allows an accuracy in the time domain that is inversely proportional to the bandwidth and thus gives much superior results with increasing bandwidth, which may be up to 20 MHz for the example of CRS in LTE compared to about 1 MHz for the PSS processing only.

FIG. 6 is a schematic diagram 600 of a correlation signal 601 based on a PSS cell search and time-domain signals 602, 603, 604 based on a CRS cell search. The correlation signal 601 shows a peak $T_0^{PSS}$ with maximum signal value at time position t0. The first CRS signal 602 shows a peak $T_0^{CRS}$ with maximum signal value at time position t1. The second CRS signal 603 shows a peak with maximum signal value at time position t2. The third CRS signal 604 shows a peak with maximum signal value at time position t3. The peaks of the second and third CRS signals 603, 604 are smaller than the peak $T_0^{CRS}$ of the first CRS signal 602.

In one example, a first threshold 610 may be applied around the peak $T_0^{PSS}$ found for the PSS correlation signal 601 and a second threshold 612 may be applied around the highest peak $T_O^{CRS}$ of the three peaks found for the CRS signals 602, 603, 604. In one example, a true cell may be detected if the second threshold 612 falls within the first threshold 610, else a ghost cell may be detected. In one example, a true cell may be detected if the second threshold 612 and the first threshold 610 are overlapping, else a ghost cell may be detected.

In one example, the first threshold 610 may be determined as the range between the zeros of the correlation signal 601 which zeros may be located adjacent to the peak value $T_0^{PSS}$ of the correlation signal 601. In one example, the second threshold 612 may be determined as the range between the zeros of the first CRS signal 602 which zeros may be located adjacent to the peak $T_0^{CRS}$ value of the first CRS signal 602 as depicted in FIG. 6.

In one example, the PSS based peak $T_0^{PSS}$ may be processed according to:

$$T_0^{PSS} = \max(\text{corr}_{time-domain}(PSS)), \quad (4)$$

where max( ) denotes maximum operation, $\text{corr}_{time-domain}()$ denotes correlation function in time-domain and PSS denotes the primary synchronization signal.

In one example, the CRS based peak $T_0^{CRS}$ may be processed according to:

$$T_0^{CRS} \max(\text{IFFT}(CRS_{freq-domain})), \quad (5)$$

where max( ) denotes maximum operation, IFFT( ) denotes inverse fast Fourier transform and $CRS_{freq-domain}$ denotes CRS signal in frequency-domain.

$T_0^{PSS}$ may correspond to the first cell time estimate by the PSS cell search. $T_0^{CRS}$ may correspond to the CRS-based time estimate, determined by MAX( ) of the IFFT output.

In one example, the CRS-based time estimate may be derived by combining more than just one resolvable channel tap detected close or at the PSS time estimate. This may be due to the higher resolution provided by CRS, as explained in the following: The IFFT in this context may be applied as oversampling IFFT, which inherently may interpolate the time signal.

For example, 100 CRS frequency-domain samples may be present at a system bandwidth of 10 MHz and spaced by 6 times 15 kHz. The CRS-IFFT with size 128 may apply zero-tailing (or zero-padding) for the missing 28 CRS samples. Then, the sampling frequency may equal 128 times 6 times 15 kHz=11.52 MHz, which is oversampling the time signal.

In one example, PSS/SSS cell search may correlate the received signal with three possible sequences of the Primary Synchronization Signal PSS in the time domain to identify the cell's physical layer identity 0, 1 or 2. The synchronization signal SSS may include 168 different sequences to identify the physical layer cell identity group. This may results in 3*168=504 cell IDs.

Figure 7A:
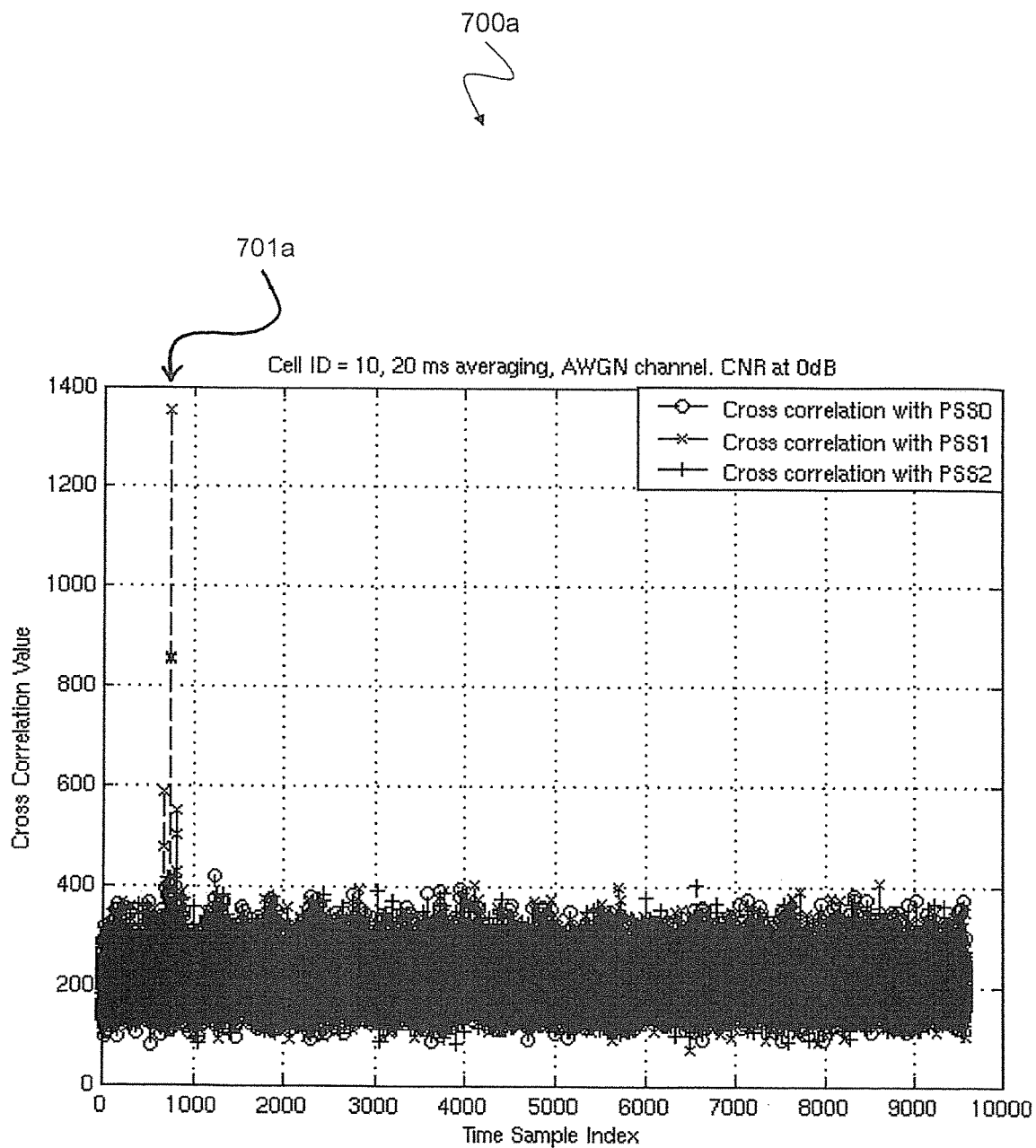

FIG. 7a is an example ghost cell simulation diagram 700a illustrating the case of false detection of PSS1 for an AWGN channel resulting in a "ghost" PSS1 peak 701a. The figure shows a PSS correlation snapshot for each of the 3 possible physical layer identities and for the AWGN channel scenario. The snapshot was stored in case of false detection of PSS1. A ghost PSS1 peak 701a can be seen for which no corresponding cell signal was configured in the simulation. CRS-IFFT processing according to the methods 300, 500 as described above with respect to FIGS. 3 and 5 do not provide any significant peak results.

Figure 7B:
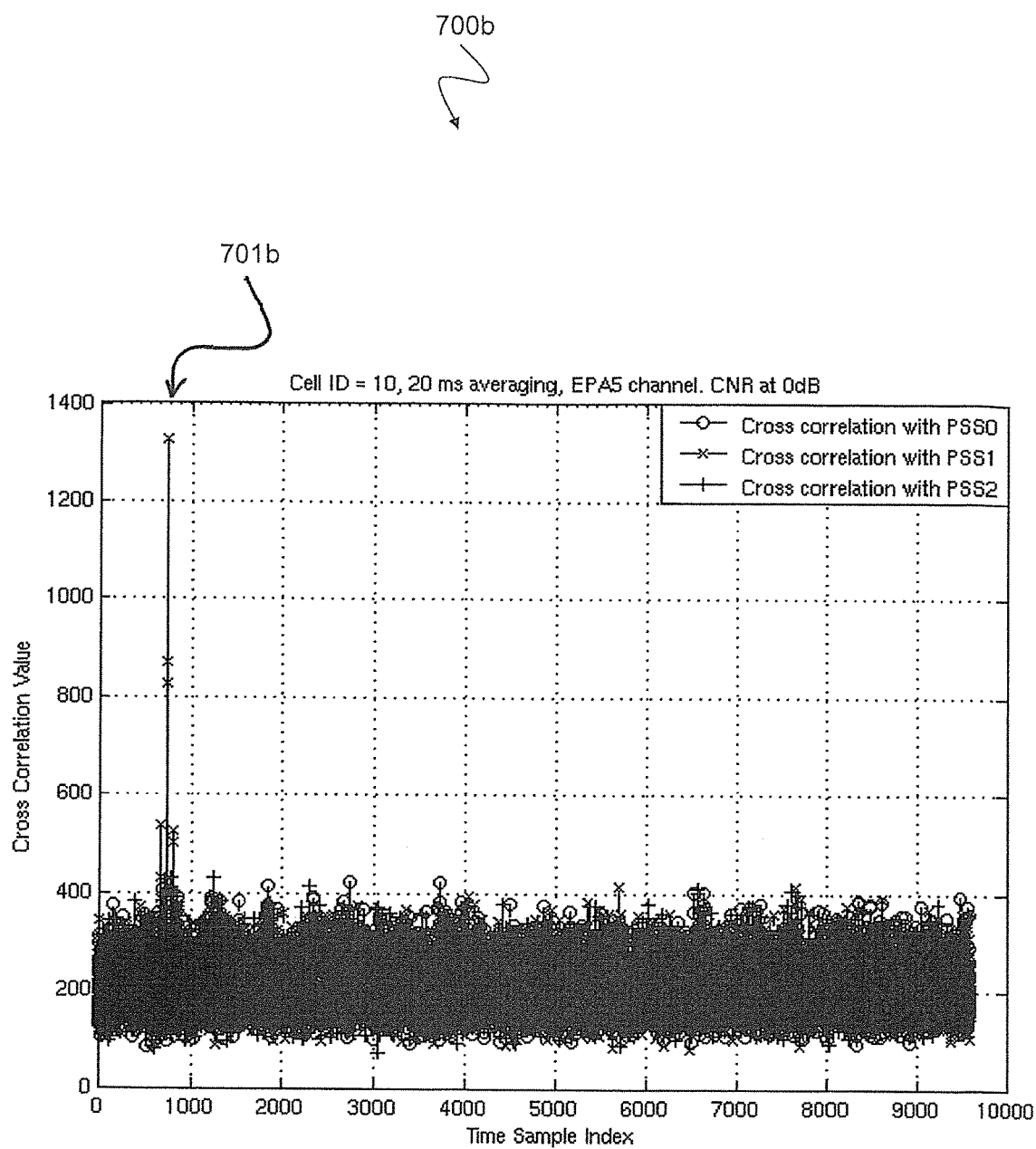
FIG. 7b is an example ghost cell simulation diagram 700b illustrating a case of false detection of PSS1 for an EPA 5 Hz channel resulting in a "ghost" PSS1 peak 701b.

FIG. 7b is an example ghost cell simulation diagram 700b illustrating the case of false detection of PSS1 for an EPA 5 Hz channel resulting in a "ghost" PSS1 peak 701b. The figure shows a PSS correlation snapshot for each of the 3 possible physical layer identities and for the EPA 5 Hz channel scenario. The snapshot was stored in case of false detection of PSS1. A ghost PSS1 peak 701b can be seen for which no corresponding cell signal was configured in the simulation. CRS-IFFT processing according to the methods 300, 500 as described above with respect to FIGS. 3 and 5 do not provide any significant peak results.

Figure 7C:
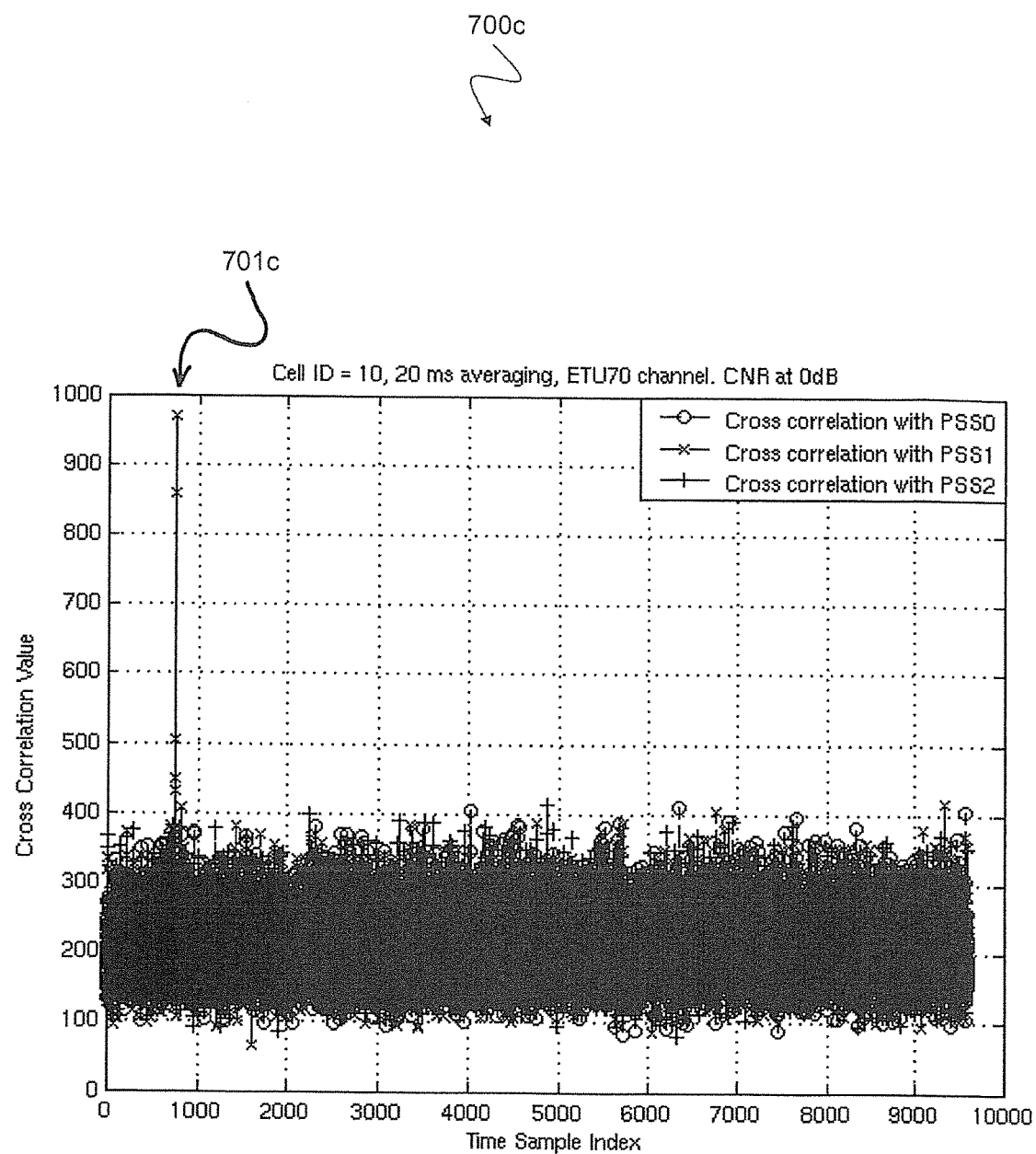
FIG. 7c is an example ghost cell simulation diagram 700c illustrating a case of false detection of PSS1 for an ETU 70 Hz channel resulting in a "ghost" PSS1 peak 701c.

FIG. 7c is an example ghost cell simulation diagram 700c illustrating the case of false detection of PSS1 for an ETU 70 Hz channel resulting in a "ghost" PSS1 peak 701c. The figure shows a PSS correlation snapshot for each of the 3 possible physical layer identities and for the ETU 70 Hz channel scenario. The snapshot was stored in case of false detection of PSS1. A ghost PSS1 peak 701c can be seen for which no corresponding cell signal was configured in the simulation. CRS-IFFT processing according to the methods 300, 500 as described above with respect to FIGS. 3 and 5 do not provide any significant peak results.

Figure 7D:
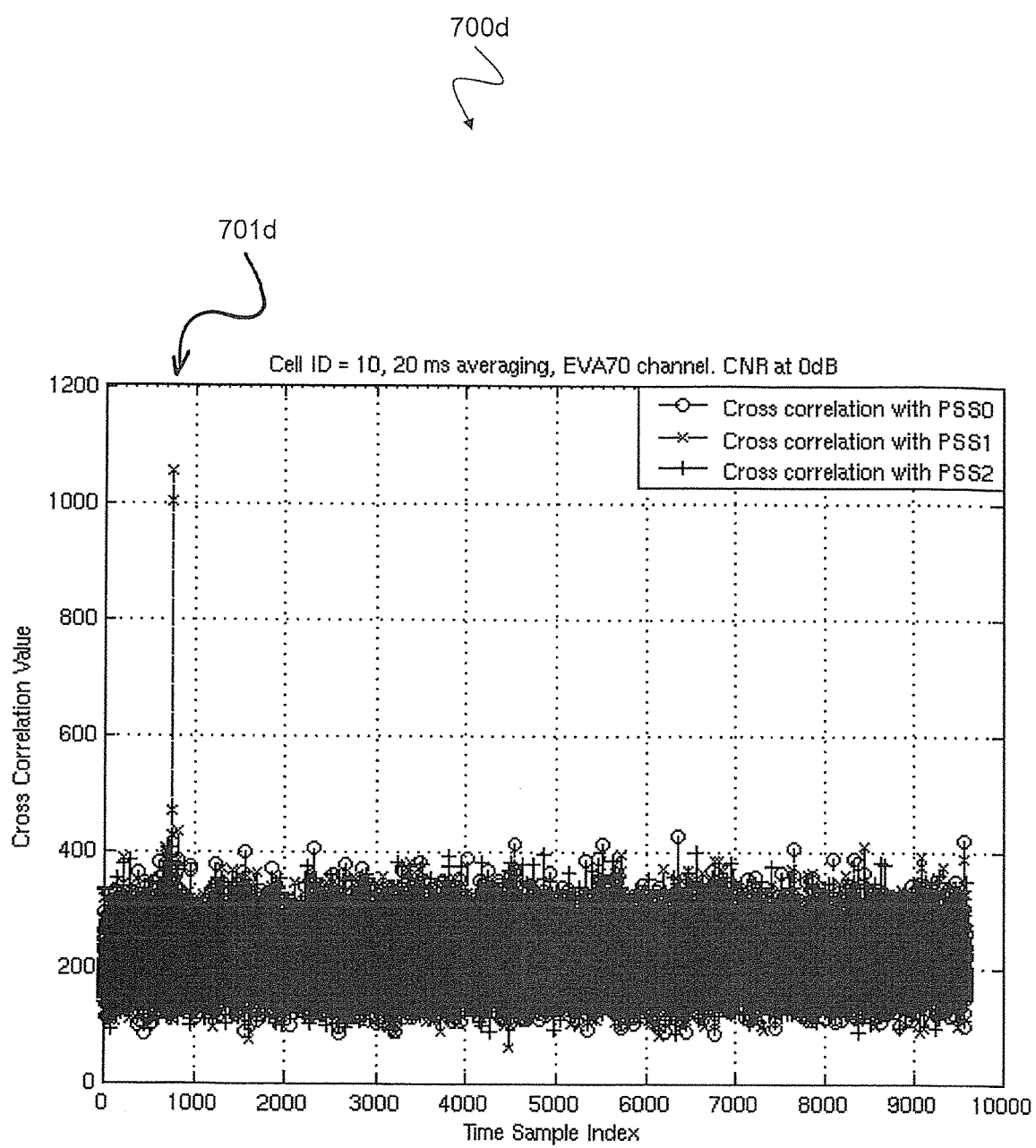
FIG. 7d is an example ghost cell simulation diagram 700d illustrating a case of false detection of PSS1 for an EVA 70 Hz channel resulting in a "ghost" PSS1 peak 701d.

FIG. 7d is an example ghost cell simulation diagram 700d illustrating the case of false detection of PSS1 for an EVA 70 Hz channel resulting in a "ghost" PSS1 peak 701d. The figure shows a PSS correlation snapshot for each of the 3 possible physical layer identities and for the EVA 70 Hz channel scenario. The snapshot was stored in case of false detection of PSS1. A ghost PSS1 peak 701d can be seen for which no corresponding cell signal was configured in the simulation. CRS-IFFT processing according to the methods 300, 500 as described above with respect to FIGS. 3 and 5 do not provide any significant peak results.

Figure 7E:
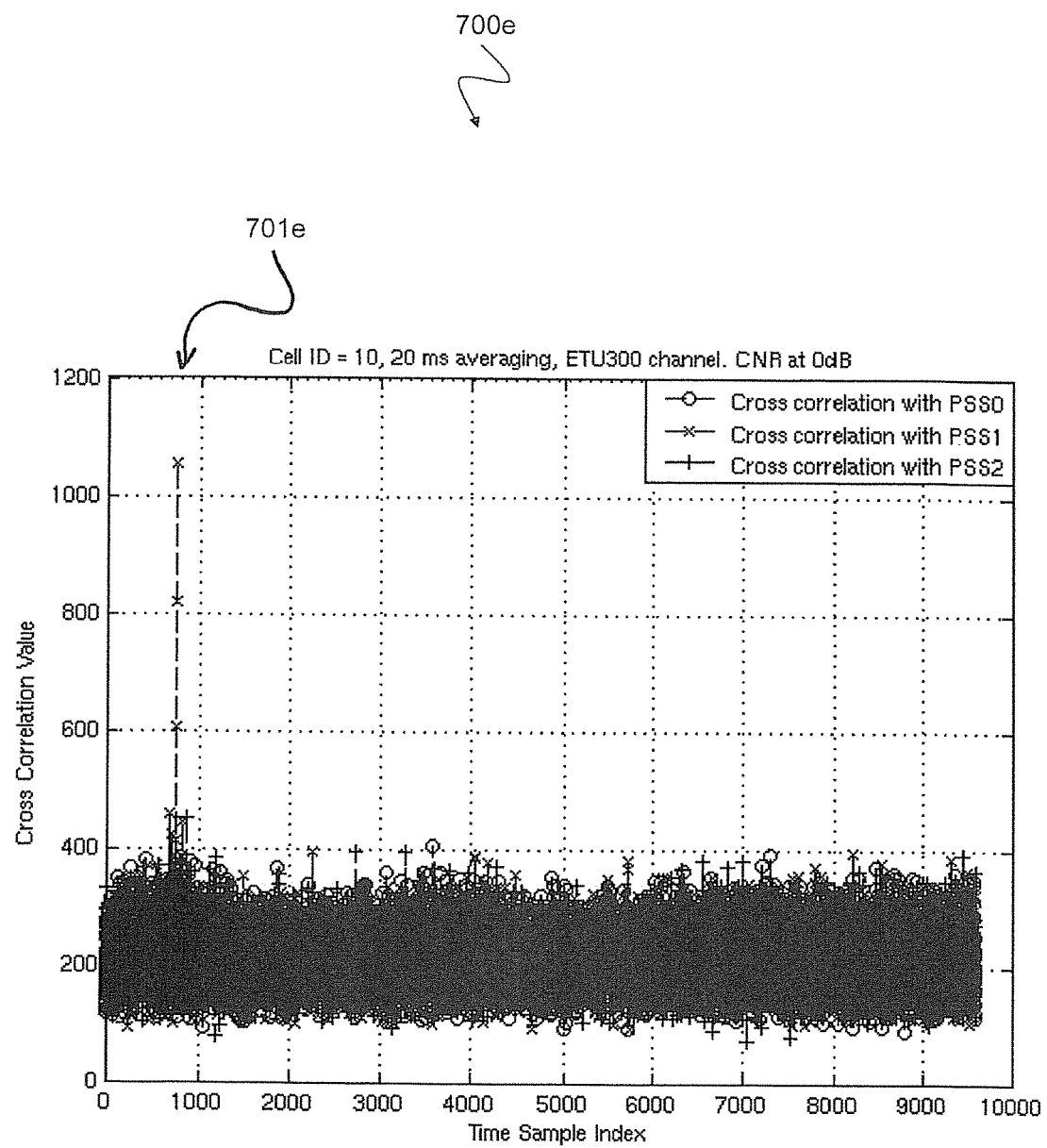
FIG. 7e is an example ghost cell simulation diagram 700e illustrating a case of false detection of PSS1 for an ETU 300 Hz channel resulting in a "ghost" PSS1 peak 701e.

FIG. 7e is an example ghost cell simulation diagram 700e illustrating the case of false detection of PSS1 for an ETU 300 Hz channel resulting in a "ghost" PSS1 peak 701e. The figure shows a PSS correlation snapshot for each of the 3 possible physical layer identities and for the ETU 300 Hz channel scenario. The snapshot was stored in case of false detection of PSS1. A ghost PSS1 peak 701e can be seen for which no corresponding cell signal was configured in the simulation. CRS-IFFT processing according to the methods 300, 500 as described above with respect to FIGS. 3 and 5 do not provide any significant peak results.

While a particular feature or aspect of the disclosure may have been disclosed with respect to only one of several implementations, such feature or aspect may be combined with one or more other features or aspects of the other implementations as may be desired and advantageous for any given or particular application. Implementations are not limited to the features defined by the claims. In particular, each feature of any claim may be liberally combined with any other feature of each claim. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

What is claimed is:

1. A method, comprising:
    receiving a signal comprising a two-dimensional signal pattern in a time-frequency representation using a receiver circuit, the two-dimensional signal pattern comprising a synchronization signal at a first predetermined position in the two-dimensional signal pattern and one or more cell-specific reference signals at one or more second predetermined positions in the two-dimensional signal pattern;
    determining a first cell identification information using a processor circuit based on a first threshold criterion with respect to a correlation of the synchronization signal;
    determining a second cell identification information using the processor circuit based on a second threshold criterion with respect to a frequency-time transformation based on the one or more cell-specific reference signals to obtain a time-domain signal using a frequency-time transformation processing circuit; and
    detecting a true cell or a ghost cell by comparing a first time range of the first cell identification information with a second time range of the second cell identification information, wherein a true cell is detected when the second time range of the second cell identification information is within or is overlapping the first time range of the first cell identification information.

2. The method of claim 1, wherein the synchronization signal comprises a primary synchronization signal.

3. The method of claim 1, wherein the one or more second predetermined positions of the one or more cell-specific reference signals in the two-dimensional signal pattern are uniformly distributed over the two-dimensional signal pattern.

4. The method of claim 1, wherein the frequency-time transformation comprises at least one of an Inverse Fast Fourier Transform, a Fast Fourier Transform, an Inverse Discrete Fourier Transform, and a Discrete Fourier Transform.

5. The method of claim 1, wherein the frequency-time transformation is based on a subset of the one or more cell-specific reference signals having a same time index in the two-dimensional signal pattern.

6. The method of claim 1, wherein determining the frequency-time transformation comprises:
    applying an Inverse Fast Fourier Transform to a subset of the one or more cell-specific reference signals having a same time index in the two-dimensional signal pattern wherein the one or more cell-specific reference signals of the same time index are zero-padded with respect to a length of the Inverse Fast Fourier Transform.

7. The method of claim 1, wherein the received signal comprises a superposition of a signal received from a target cell of a cellular radio system and a signal received from an interfering cell of the cellular radio system.

8. The method of claim 1, further comprising:
    verifying the first cell identification information based on the second cell identification information.

9. The method of claim 8, wherein a bandwidth of the synchronization signal is smaller than a bandwidth of the one or more cell-specific reference signals, in particular such that a timing accuracy with respect to the time-domain signal is below a cyclic prefix.

10. The method of claim 8, wherein a number of frequency-domain samples of the synchronization signal is smaller than a number of frequency-domain samples of the one or more cell-specific reference signals.

11. The method of claim 8, wherein the frequency-time transformation based on the one or more cell-specific reference signals provides independent information from a correlation of the synchronization signal in the time domain.

12. The method of claim 1, wherein the first time range is based on a first zero-crossings pair around a first peak of the first cell identification information, and the second time range is based on a second zero-crossing pair around a second peak of the second cell identification information.

13. The method of claim 1, wherein the one or more second predetermined positions are different from the first predetermined position.

14. A device, comprising:
    a first circuit configured to receive a signal comprising a two-dimensional signal pattern in a time-frequency representation, the two-dimensional signal pattern comprising a primary synchronization signal at a first predetermined position in the two-dimensional signal pattern and one or more cell specific reference signals at one or more second predetermined positions in the two-dimensional signal pattern;
    a second circuit configured to determine a correlation of the primary synchronization signal and a frequency-time transformation based on the one or more cell-specific reference signal to obtain a time-domain signal; and
    a third circuit configured to detect a true or ghost cell by comparing a first time range of the first cell identification information with a second time range of the second cell identification information, wherein a true cell is detected when the second time range of the second cell identification information is within or is overlapping the first time range of the first cell identification information.

15. The device of claim 14, wherein the device comprises a chip, and the device is part of a mobile device.

16. A method, comprising:
receiving a signal using a receiver circuit, the signal comprising a two-dimensional signal pattern in a time-frequency representation, the two-dimensional signal pattern comprising a primary synchronization signal at a first predetermined position in the two-dimensional signal pattern and one or more cell-specific reference signals at one or more second predetermined positions in the two-dimensional signal pattern;
determining a first cell identification information using a processor circuit based on a first threshold criterion with respect to a correlation of the primary synchronization signal;
determining a second cell identification information using the processor circuit based on a second threshold criterion with respect to a frequency-time transformation based on the one or more cell-specific reference signals; and
detecting a true cell or a ghost cell by comparing a first time range of the first cell identification information with a second time range of the second cell identification information, wherein a true cell is detected when the second time range of the second cell identification information is within or is overlapping the first time range of the first cell identification information.

17. The method of claim 16, wherein determining the second cell identification information comprises:
applying an Inverse Fast Fourier Transform to the one or more cell-specific reference signals which are zero-padded with respect to a length of the Inverse Fast Fourier Transform.

18. The method of claim 16, comprising:
wherein the first time range is based on a first zero-crossing pair around a first peak of the first cell identification information, and the second time range is based on a second zero-crossing pair around a second peak of the second cell identification information.

* * * * *